United States Patent [19]

Takeuchi et al.

[11] Patent Number: 4,476,199

[45] Date of Patent: Oct. 9, 1984

[54] FUSED CARBONATE FUEL CELL

[75] Inventors: Masato Takeuchi, Katsuta; Hideo Okada; Sigeru Okabe, both of Hitachi; Hiroshi Tobita, Kitaibaraki; Munehiko Tonami, Hitachi, all of Japan

[73] Assignee: Hitachi, Ltd., Tokyo, Japan

[21] Appl. No.: 461,255

[22] Filed: Jan. 26, 1983

[30] Foreign Application Priority Data

Jan. 29, 1982 [JP] Japan .................................. 57-11516

[51] Int. Cl.³ .......................................... H01M 8/14
[52] U.S. Cl. ........................................ 429/34; 429/41; 429/45; 429/46
[58] Field of Search ..................... 429/33, 34, 46, 103, 429/16, 41, 112, 44, 45

[56] References Cited

U.S. PATENT DOCUMENTS

| | | | |
|---|---|---|---|
| 4,057,678 | 11/1978 | Walker | 429/103 X |
| 4,086,396 | 4/1978 | Mathers et al. | 429/103 |
| 4,111,968 | 10/1983 | Reiser et al. | 429/41 |
| 4,317,865 | 3/1982 | Trocciola et al. | 429/44 X |
| 4,382,117 | 5/1983 | Kunze | 429/132 |

*Primary Examiner*—Anthony Skapars
*Attorney, Agent, or Firm*—Antonelli, Terry & Wands

[57] ABSTRACT

A fused carbonate type of fuel cell comprising an electrolytic body retaining an electrolyte therein which is arranged between an anode and a cathode, where electricity is electrochemically generated by feeding fuel gas and an oxidant to a fuel chamber arranged on the anode side and an oxidant chamber arranged on the cathode side, respectively, said fuel cell being characterized in that the electrolytic body comprises an electrolyte, an electrolyte-holding member for holding the electrolyte and an inorganic binder.

4 Claims, 1 Drawing Figure

U.S. Patent  Oct. 9, 1984  4,476,199
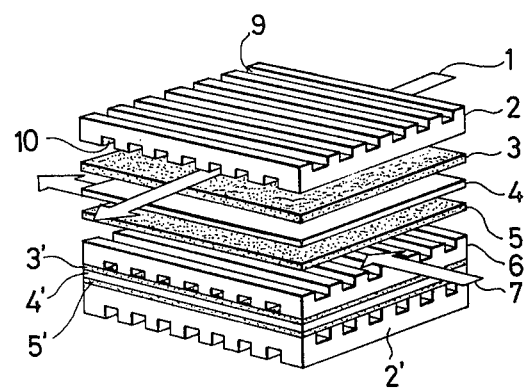

FUSED CARBONATE FUEL CELL

FIELD OF THE INVENTION

The present invention relates to a fused carbonate type of fuel cell. More particularly, the present invention relates to a fuel cell comprising an electrolytic body retaining an electrolyte therein.

BACKGROUND OF THE INVENTION

There are two types of electrolytic body, one type is an electrolytic body comprising an electrolyte retained in a porous ceramic sintered body (hereinafter called a "matrix type of electrolytic body") and the other type is a molded body of a mixture of non-electroconductive fine particles and an electrolyte (hereinafter called a "paste type of electrolytic body").

The conventional electrolytic bodies are not satisfactory in the following points.
(1) Warping or cracks can formed in the electrolytic body during the preparation process.
(2) Cracks can be formed during the operation of the cell.
(3) Thermal deformation can occur during the operation of the cell.
(4) The electrolyte capacity is low.

SUMMARY OF THE INVENTION

It is a primary object of the present invention to provide a fuel cell comprising an electrolytic body in which the above defects of conventional fuel cells are eliminated, with good molding properties and a high mechanical strength, an excellent electrolyte capacity, and in which a high cell capacity is stably exerted.

In accordance with the present invention, a fused carbonate type of fuel cell is provided comprising an electrolytic body retaining an electrolyte therein, which is arranged between an anode and a cathode, in which electricity is electrochemically generated by feeding fuel gas and an oxidant to a fuel chamber arranged on the anode side and an oxidant chamber arranged on the cathode side, respectively, said fuel cell being characterized in that the electrolytic body comprises the electrolyte, an electrolyte-retaining member for retaining the electrolyte and an inorganic binder.

BRIEF DESCRIPTION OF THE DRAWING

FIGURE shows a perspective view of an important part of a fused carbonate fuel cell assembly to which the present invention is applied.

DETAILED DESCRIPTION OF THE PREFERRED EMBODIMENTS

The present invention has been completed as the result of research made with a view to solve the following two problems simultaneously. Namely, with a matrix type of electrolytic body, deformation such as warping readily occurs in the molded body during high-temperature sintering, and with a paste type of electrolytic body, the mechanical strength is low.

A fused carbonate fuel cell shown in FIGURE is constituted by a separator 2, 2' made of an electrically conductive, heat resistant material, such as stainless steel (SUS 316), a cathode plate 3, 3' made of a catalytic material such as sintered nickel compact, an electrolytic body 4, 4' made of a porous ceramic tile which is impregnated with an electrolytic composition such as $K_2CO_3$, $Li_2CO_3$, and/or $Na_2CO_3$ an anode plate 5, 5' made of the catalytic material, and a separator 6 made of an electrically conductive, heat resistant material (SUS 316).

The separator 2, 2' has a plurality of grooves 9 or 10 on each end face thereof; one group of grooves 9 on one face constitutes a gas passage for fuel gas such as hydrogen gas 7, and the other group of grooves 10 on the other face constitutes a gas passage for oxidant gas such as air 1. The gas passage 10 is used for carrying carbon dioxide gas which is produced by fuel reaction into the fuel cell together with air.

The assemblies are generally stacked as shown in FIGURE by a compressive force to assure an electrical connection between the separators and electrodes.

According to a preferred embodiment, a metal salt of a polyacid is used as the inorganic binder.

A polyacid is an oxyacid which forms a poly-nuclear complex salt having at least two nuclei by the condensation of acid groups. Polyacids are often observed with respect to elements of groups III and VI of the Periodic Table, especially boron, silicon, phosphorus, sulfur, vanadium, niobium, tantalum, chromium, molybdenum and tungsten. Among these polyacids, there are isopolyacids comprising one central ion, such as tripolyphosphate ($H_5P_3O_{10}$), and heteropolyacids comprising at least two central ions, such as silicontungstic acid ($H_3 HSiW_{12}O_{40}$).

The inventors have found that when a metal salt of such an inorganic polymeric substance is used as the binder, the binding properties of the electrolyte-retaining member are increased and an electrolytic body having an increased electrolyte capacity can be obtained.

Of such inorganic polymeric substances, a salt of a polyphosphoric acid is particularily excellent as the binder.

As is well-known, when orthophosphoric acid is heated, dehydration occurs to form a viscous syrup, and when the dehydration is further advanced, the syrup becomes a white vitreous substance, that is, metaphosphoric acid. This convention is given by the following formula:

Similarly, a phosphate, for example, an alkali metal dihydrogenphosphate, is finally converted by dehydration to an alkali metal metaphosphate which is a white vitreous substance, as given by the following formula:

It has been found that when this reaction is carried out in the presence of an electrolyte-retaining member, this polyacid salt acts as a strong binder and binds the electrolyte-retaining member tightly.

Not only alkali metal salts but also alkaline earth metal salts and other salts such as salts of titanium, zirconium or tin can be used as the metal salt. However, in the fused carbonate type of fuel cell, since the electrolyte is an alkali metal carbonate, in view of its affinity with alkali metal carbonates, an alkali metal salt of polyphosphoric acid is most preferred.

When salts of other polyacids, for example borates or sodium silicates, are used as the binder, a similar effect can be attained, and a salt of a heteropolyacid such as a phosphomolybdate shows a certain effect.

According to one method for obtaining the electrolytic body of the present invention, the electrolyte-retaining member is mixed with the precursor of the polyacid salt at a predetermined ratio, the mixture is formed into a molded body and the molded body is heat-treated, whereby the precursor is converted to the polyacid salt and simultaneously the polyacid salt binds the electrolyte-retaining member. An alkali metal carbonate used as the electrolyte is fused and the resultant heated molded body is impregnated with the fused alkali metal carbonate. There is also a method in which, before the step of impregnation with the electrolyte, the temperature is raised to sinter the molded body comprising the electrolyte-retaining member and the binder, and the sintered body is then impregnated with the electrolyte. In this method, it is necessary that the operation should be controlled so that warping does not occur during the sintered step.

In another method, the electrolyte-retaining member, the polyacid salt or its precursor, and the electrolyte are mixed together at a predetermined ratio, the mixture is formed into a molded body and the molded body is sintered at the lowest temperature necessary for obtaining the binding effect, whereby a paste type of electrolytic body is obtained.

The present invention will now be described in detail with reference to the following example.

EXAMPLE 1

66 g of lithium aluminate having an average particle size of 0.5 microns was mixed with 34 g of top grade reagent lithium dihydrogenphosphate ($LiH_2PO_4$), water was added to the mixture and the resulting mixture was kneaded sufficiently. The mixture was dried at 140° C. for 2 hours, pulverized to 100 mesh by a pulverizer and graded. The pulverized mixture was formed into a molded body having a length of 200 mm, a width of 200 mm and a thickness of 1.5 mm by using a cold press. The molded body was heated to 700° C. with the temperature increasing at 100° C./hr while being degassed, and the molded body was maintained at this temperature for about 2 hours. The temperature was then lowered to 550° C. A mixed electrolyte of lithium carbonate and potassium carbonate (at a molar ratio of 62/38) was fused and the molded body comprising the electrolyte-retaining member and the binder (about 30% by weight) was impregnated with the fused electrolyte. The impregnated molded body was then cooled to obtain the electrolyte body.

Sintered bodies of porous nickel and of lithium containing nickel oxide were used as the anode and cathode respectively. A single cell was made by using these electrodes and the electrolyte body obtained by the above method, putting the latter between both said electrodes, then the cell performance was measured.

A mixed gas comprising 50% hydrogen and 50% nitrogen was supplied to a fuel chamber on the anode side, and a mixed gas comprising 15% oxygen, 30% carbon dioxide, and 55% nitrogen was supplied to an oxidant chamber on the cathode side, and the cell was operated at 650° C. When the cell was discharged at a current density of 100 mA/cm$^2$ and the cell voltage was measured, it was found that the initial value was 0.80 V and the value after the lapse of 100 hours was 0.81 V, and the capacity was not reduced even by 100 hours of operation. No substantial leakage of gas from a wet seal was observed during the operation. Furthermore, when shut-down (650° C.→300° C.) was repeated (three times), no gas-cross phenomenon was observed.

EXAMPLE 2

90 g. of magnesia powder having a mean particle size of 1.0 μm was mixed with 10 g. of sodium silicate; then the mixture was admixed with water, and the aqueous mixture was thoroughly kneaded. The composition was dried at 140° C. for 2 hours. The resulting mixture was ground with a ball milling machine to produce powder which passes a 100 mesh sieve (Taylor).

The resulting powder was cold-pressed to form a plate of 1.5 mm thick and 100 mm wide × 100 mm long. The green plate was heated by elevating a temperature at a rate of 100° C./h to 900° C. and calcined at 900° C. for 3 hours, then the temperature was lowered to 550° C.

The resulting plate (electrolyte retaining member) which consists of about 90% by weight of magnesia and about 10% by weight of the binder (sodium silicate) was impregnated with a mixed electrolyte composition consisting of 62 mole % of lithium carbonate and 38 mole % of pottasium carbonate by fusing the composition.

Using the resulting electrolytic body, cell characteristics were measured in the same manner as in Example 1.

Cell voltages at a discharge of 100 mA/cm$^2$ were 0.79 V (initial) and 0.8 V (after 100 hours).

After the 3 repetitions of shut-downs of the fuel cell no gas cross over was observed.

EXAMPLE 3

In place of $LiH_2PO_4$ used in Example 1, $H_5P_3O_{10}$ was used to prepare an electrolytic body.

This body also exhibited substantially the same characteristics as the body of Example 1.

What is claimed is:

1. A fused carbonate type fuel cell comprising an electrolytic body holding an electrolyte therein which is arranged between an anode and a cathode, wherein electricity is electrochemically generated by feeding fuel and an oxidant to a fuel chamber arranged on the anode side and an oxidant chamber arranged on the cathode side, respectively, said electrolytic body comprising an electrolyte of alkali metal carbonate, an electrolyte-retaining member for retaining the electrolyte and an inorganic binder of an alkali metal metaphosphate represented by the formula $MPO_3$ wherein M designates an alkali metal.

2. A fused carbonate fuel cell according to claim 1, wherein the electrolyte-retaining member is lithium aluminate.

3. A fused carbonate fuel cell according to claim 1, wherein the electrolyte-retaining member is magnesia.

4. A fused carbonate fuel cell according to claim 1, wherein the alkali metal metaphosphate is lithium metaphosphate and the electrolyte is a mixture of lithium carbonate and potassium carbonate.

* * * * *